United States Patent [19]

Hasegawa et al.

[11] Patent Number: 4,498,443
[45] Date of Patent: Feb. 12, 1985

[54] FUEL SUPPLY CONTROL METHOD HAVING FAIL-SAFE FUNCTION FOR ABNORMALITIES IN INTAKE PASSAGE PRESSURE DETECTING MEANS OF AN INTERNAL COMBUSTION ENGINE HAVING A TURBOCHARGER

[75] Inventors: Shumpei Hasegawa, Niiza; Akihiro Yamato, Shiki, both of Japan

[73] Assignee: Honda Motor Co., Ltd., Tokyo, Japan

[21] Appl. No.: 496,590

[22] Filed: May 20, 1983

[30] Foreign Application Priority Data

May 24, 1982 [JP] Japan .................................. 57-87753

[51] Int. Cl.³ ............................................ F02M 51/00
[52] U.S. Cl. .............................. 123/478; 123/198 DB; 60/605
[58] Field of Search ................. 123/478, 479, 198 DB; 60/605, 603, 601, 597, 598

[56] References Cited

U.S. PATENT DOCUMENTS 3,188,797  6/1965  Toth, Jr. ................................ 60/605
3,541,784 11/1970  Hasse .................................... 60/605
4,044,560  8/1977  Dorsch et al. ................. 123/198 DB
4,400,944  8/1983  Iwamoto et al. ...................... 60/605

FOREIGN PATENT DOCUMENTS 0074531  3/1983  European Pat. Off. ............. 60/605
0041429  4/1981  Japan .................................... 60/605
0072239  6/1981  Japan .................................. 123/478

Primary Examiner—Parshotam S. Lall
Attorney, Agent, or Firm—Arthur L. Lessler

[57] ABSTRACT

A fuel supply control method for electronically controlling the quantity of fuel being supplied to an internal combustion engine having a turbocharger, in response to values of engine control parameters including at least pressure in the intake passage of the engine, the method having a fail-safe function for an abnormality in the functioning of a pressure detecting means for detecting the above intake passage pressure. When there occurs an abnormality in the above pressure detecting means and at the same time, if the engine is operating in a predetermined supercharged operating condition, control is effected by interrupting the fuel supply to the engine during an interval of time when a condition is satisfied that an abnormality occurs in the absolute pressure detecting means while simultaneously the engine is operating in the above predetermined supercharged operating condition. Preferably, either when a value of the intake passage pressure detected by second pressure detecting means exceeds a predetermined value, or when a throttle valve opening of the engine exceeds a predetermined value, it is determined that the engine is operating in the above predetermined supercharged operating condition.

4 Claims, 3 Drawing Figures

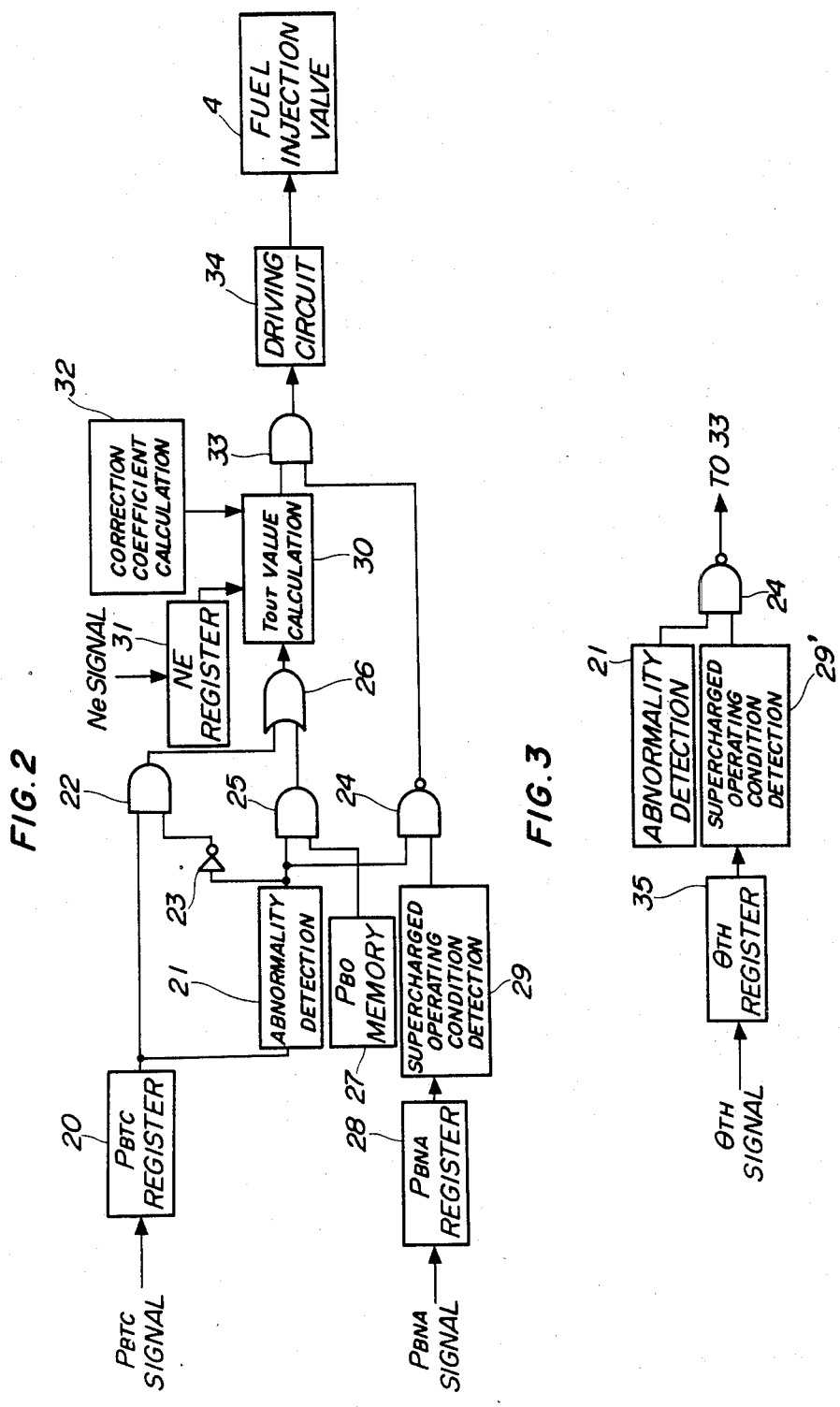

FUEL SUPPLY CONTROL METHOD HAVING FAIL-SAFE FUNCTION FOR ABNORMALITIES IN INTAKE PASSAGE PRESSURE DETECTING MEANS OF AN INTERNAL COMBUSTION ENGINE HAVING A TURBOCHARGER

BACKGROUND OF THE INVENTION

This invention relates to a fuel supply control method for an internal combustion engine having a turbocharger, and more particularly to a method of this kind which is adapted to perform a fail-safe function to counteract an abnormality in the functioning of intake passage pressure detecting means, so as to prevent local overheating in the interior of the engine cylinders caused by the malfunction of the above pressure detecting means.

A fuel supply control system adapted for use with an internal combustion engine, particularly a gasoline engine has been proposed e.g. by U.S. Pat. No. 3,483,851, which is adapted to determine the valve opening period of a fuel quantity metering or adjusting means for control of the fuel injection quantity, i.e. the air/fuel ratio of an air/fuel mixture being supplied to the engine, by first determining a basic value of the above valve opening period as a function of at least the intake pipe absolute pressure and then adding to and/or multiplying same by constants and/or coefficients being functions of engine rpm, intake air temperature, engine cooling water temperature, throttle valve opening, exhaust gas ingredient concentration (oxygen concentration), atmospheric pressure, etc., by electronic computing means.

In this proposed fuel supply control system, when a defect in the sensor body or a disconnection in the wiring occurs in the intake passage pressure detecting means that detects the intake passage absolute pressure of the engine, it becomes impossible to continue not only the above-mentioned air/fuel ratio control in a proper manner, but also to continue the operation of the engine. A possible measure to cope with such an accident is to effect the control by determining the quantity of fuel to the engine by the use of a constant absolute pressure value $PB_0$ set in advance, in lieu of the value of an absolute pressure (PB) signal outputted by the above detecting means, thereby somehow enabling continued operation of the engine.

On the other hand, in an engine equipped with a turbocharger, when the engine is being supercharged at a high supercharging rate, the air/fuel ratio of the air/fuel mixture being supplied to the engine is set to a rich ratio, in order to obtain a high engine output responsive to the supply of a large quantity of fuel to the engine, as well as to effect cooling of locally overheated areas in the engine cylinders. That is, when the engine is being supercharged at a high supercharging rate, the intake air pressure and the intake air temperature increase so that the combustion temperature increases in the engine cylinders, which can cause certain local areas of cylinders, e.g. the tip of the ignition plug, to easily get overheated, resulting in inconveniences such as premature ignition of the air/fuel mixture. Therefore, it is essentially necessary to effect cooling of the overheated engine cylinders by fuel contained in the air/fuel mixture supplied to the engine while the engine is operating in a high-rate supercharged condition, in order to achieve proper driveability and long life of the engine.

However, if during engine operation in a high-rate supercharged condition which essentially requires a large quantity of fuel supply to the engine, the aforementioned constant value $PB_0$ of the intake passage absolute pressure is used in place of actual intake passage absolute pressure PB detected by the absolute pressure detecting means, when an abnormality occurs in the functioning of the above absolute pressure detecting means, the quantity of fuel supplied to the engine becomes insufficient, resulting in inadequate cooling of the locally overheated engine cylinder regions, thereby causing abnormal combustion in the engine cylinders such as premature combustion.

SUMMARY OF THE INVENTION

It is the object of the invention to provide a fuel supply control method for an internal combustion engine having a turbocharger, which is adapted to perform a fail-safe function to counteract an abnormality in the functioning of the intake passage pressure detecting means, which occurs while the engine is operating in a predetermined supercharged operating condition, by interrupting the fuel supply to the engine so as to prevent local overheating in the engine cylinders.

According to the invention, a fuel supply control method is provided for electronically controlling the quantity of fuel being supplied to an internal combustion engine having a turbocharger, an intake passage, a throttle valve arranged in the intake passage and an intake passage pressure detecting means for detecting pressure in the intake passage at a location downstream of the throttle valve, in response to values of engine control parameters including at least a value of the intake passage pressure detected by the above pressure detecting means.

The method according to the invention is characterized by comprising the following steps: (1) detecting whether or not there is an abnormality in the functioning of the aforementioned pressure detecting means; (2) determining whether or not the engine is operating in a predetermined supercharged operating condition; (3) interrupting the fuel supply to the engine when an abnormality is detected in the functioning of the above pressure detecting means while the engine is determined to be operating in the above predetermined supercharged operating condition.

Preferably, either when the value of the intake passage pressure detected by a second pressure detecting means for detecting pressure in the above intake passage exceeds a predetermined value, or when a throttle valve opening of the engine exceeds a predetermined value, it is determined that the engine is operating in the above predetermined supercharged operating condition.

The above and other objects, features and advantages of the invention will be more apparent from the ensuing detailed description taken in conjunction with the accompanying drawings.

BRIEF DESCRIPTION OF THE DRAWINGS

FIG. 2 is a circuit diagram illustrating an electrical circuit within the electronic control unit (ECU) in FIG. 1; and FIG. 3 is a circuit diagram illustrating a modification of the section for detecting engine operation in a predetermined high-rate supercharged operating condition, within the circuit shown in FIG. 2.

DETAILED DESCRIPTION

Figure 1:
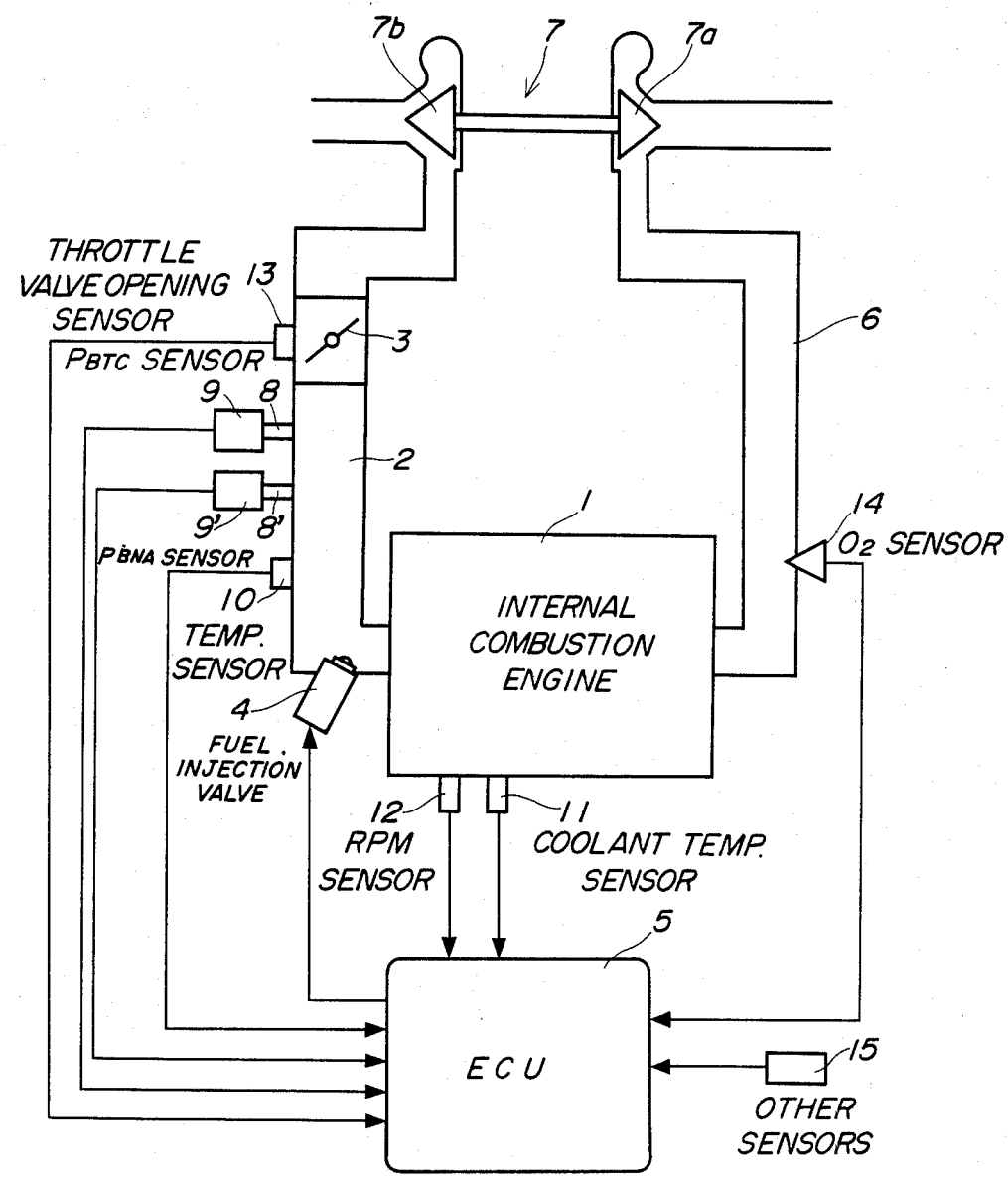
FIG. 1 is a block diagram illustrating the whole arrangement of a fuel supply control system to which is applicable the method according to the present invention.

The method of the invention will now be described in detail with reference to the drawings.

Referring first to FIG. 1, a fuel supply control system is schematically illustrated, to which is applicable the method of this invention. In FIG. 1, reference numeral 1 designates an internal combustion engine which may be a four cylinder type, for instance, and to which is connected an intake passage 2 with a throttle valve 3 arranged therein. A fuel injection valve 4 is arranged in a manner projected into the intake passage 2 at a location slightly upstream of an intake valve of a corresponding one of the engine cylinders, not shown, between the engine 1 and the throttle valve 3, for fuel supply to the corresponding engine cylinder. Each of such fuel injection valves 4 is connected to a fuel pump, not shown, and is electrically connected to an electronic control unit (hereinafter called "ECU") 5.

A turbocharger 7 has a turbine 7a arranged inside the exhaust pipe 6 of the engine 1 so as to drive the compressor 7b of the turbocharger 7, arranged in the intake passage 2 at a location upstream of the throttle valve 3, in response to a flow of exhaust gases emitted by the engine.

An absolute pressure (PBTC) sensor 9 and another absolute pressure (PBNA) sensor 9' are arranged at locations immediately downstream of the throttle valve 3, which communicate with the intake pasage 2, respectively, through conduits 8 and 8', and are electrically connected to the ECU 5. Since the intake air absolute pressure varies over a wide range due to the provision of the turbocharger, two such absolute pressure sensors 9 and 9' are provided to measure with accuracy supercharged pressure (higher pressure) and lower pressure, respectively. These sensors 9, 9' supply respective electrical signals indicative of detected absolute pressures to the ECU 5. Also, an intake air temperature sensor 10 is arranged in the intake passage 2, which supplies a signal indicative of detected intake air temperature to the ECU 5. A throttle valve opening sensor 13 is mounted on the throttle valve 3, which supplies a signal indicative of detected throttle valve opening to the ECU 5.

An engine cooling water temperature sensor 11, which may be formed of a thermistor or the like, is mounted on the body of the engine in a manner embedded in the peripheral wall of an engine cylinder having its interior filled with engine cooling water, and an electrical output signal of which is supplied to the ECU 5.

An engine rpm sensor (hereinafter called "Ne sensor") 12 is arranged on a camshaft or a crankshaft of the engine, neither of which is shown, which sensor generates one pulse at a particular predetermined crank angle of the engine and applies such pulses to the ECU 5. An $O_2$ sensor 14 is inserted in the exhaust pipe 6 of the engine at a location between the aforementioned turbine 7a of the turbocharger 7 and the engine 1 for detecting oxygen concentration in the exhaust gases from the engine and supplying a signal indicative of detected concentration to the ECU 5. Further, there are provided other engine parameter sensors 15 for detecting, e.g., atmospheric pressure, back pressure, etc. detected values of which are supplied to the ECU 5 as other engine parameter signals.

After determining whether or not there is an abnormality in the signal generated by the absolute pressure PBTC sensor 9, in a manner hereinafter explained, the ECU 5 operates on the basis of the various engine parameter signals, inputted thereto to determine the valve opening period TOUT of the fuel injection valves 4 by the following equation:

$$TOUT = Ti \times K_1 + K_2 \qquad (1)$$

wherein Ti indicates the basic fuel injection period of the fuel injection valves 4 and is calculated as a function of the intake passage absolute pressure PB and the engine rpm Ne. When the intake passage absolute pressure PB is higher than a predetermined value (e.g. 1160 mmHg), which is likely to occur particularly while the engine is operating in a supercharged operating condition, the Ti value is determined on the basis of a value of the absolute pressure signal outputted by the absolute pressure (PBTC) sensor 9, and on the other hand, when the absolute pressure PB is lower than the above predetermined value, the Ti value is determined on the basis of a value of the absolute pressure signal outputted by the absolute pressure (PBNA) sensor 9'. In the above equation, $K_1$ and $K_2$ represent correction coefficients dependent upon the values of signals from the above various sensors, that is, the intake passage absolute pressure sensors 9, 9', the intake air temperature sensor 10, the engine cooling water temperature sensor 11, the Ne sensor 12, the throttle valve opening sensor 13, the $O_2$ sensor 14, and the other engine parameter sensors 15, and are calculated by the use of predetermined equations so as to optimize the startability, emission characteristics, fuel consumption, acceleratability, etc. of the engine.

FIG. 2 shows a circuit for carrying out one embodiment of the method of the invention, forming part of the internal arrangement within the ECU 5 in FIG. 1, and inclusive of a section for calculating the valve opening period TOUT value through the use of the above equation (1) by applying the value of the absolute pressure signal detected by the absolute pressure (PBTC) sensor 9.

The value of the absolute pressure signal from the absolute pressure (PBTC) sensor 9, in FIG. 1, is supplied to a PBTC value register 20 and stored therein, after being converted into a digital signal by an analog-to-digital converter, not shown. The above PBTC value is supplied to an AND circuit 22 at one input terminal as well as to an abnormality detecting circuit 21. In the latter circuit, it is detected whether or not there is an abnormality in the value of the PBTC signal outputted by the absolute pressure (PBTC) sensor 9. The manner of detecting such abnormality by the abnormality detecting circuit 21 may be, for example, such as to determine whether or not the value of the absolute pressure (PBTC) signal is within a range of values having an upper limit which is a value of maximum absolute pressure that can occur during normal engine operation and a lower limit which is a value of least absolute pressure that can occur during normal engine operation, and to judge that there is, an abnormality in the absolute pressure detecting means when a value of the absolute pressure (PBTC) signal outputted by the above PBTC sensor 9 continues to remain outside the above range for a predetermined period of time. When the abnormality detecting circuit 21 detects an abnormality in the value of the absolute pressure (PBTC) signal, the same circuit 21 generates a signal having a high level of 1 and applies it to an AND circuit 25 and a NAND circuit 24 at their one input terminals. At the same time, the same signal from the circuit 21 is inverted into a signal having a low level of 0 by an inverter 23, and applied to the above AND circuit 22 at the other input terminal. The AND circuit 22 is thus deenergized to interrupt the transfer of the value of the absolute pressure PBTC signal supplied to its other input terminal from the PBTC value register 20 to a TOUT value calculating control circuit 30 through an OR circuit 26. On the other hand, the energized AND circuit 25 transfers a constant $PB_0$ value of the absolute pressure (e.g. 460 mmHg) stored in a $PB_0$ value memory 27 and connected to its other input terminal, to the TOUT value calculating control circuit 30 through the OR circuit 26 as an absolute pressure (PBTC) signal.

Connected to the other inputs of the TOUT value calculating control circuit 30 are an Ne value register 31 and a correction coefficient calculating circuit 32. The Ne value register 31 supplies th TOUT value calculating circuit 30 with a stored value of the engine rpm Ne supplied thereto from the Ne sensor 12 in FIG. 1, after the same is converted into a digital signal by an analog-to-digital converter, not shown. The correction coefficient calculating circuit 32 calculates the values of the correction coefficients $K_1$, $K_2$ of the aforementioned equation (1), on the basis of engine parameter signals from the above intake air temperature sensor 10, the engine cooling water temperature sensor 11, etc. so as to optimize the engine operating condition, and supplies the calculated values of coefficients $K_1$, $K_2$ to the TOUT value calculating control circuit 30. The TOUT value calculating control circuit 30 calculates the basic fuel injection period Ti of the equation (1) by the use of the values of the above absolute pressure (PBTC) signal and the engine rpm Ne signal, and multiplies the calculated Ti value by the correction coefficient $K_1$ and adds the resultant product value to the value of the correction coefficient $K_2$ to obtain a value of the valve opening period TOUT. The control circuit 30 supplies the above calculated TOUT value to a driving circuit 34 through an AND circuit 33. This AND circuit 33 is normally in an energized state to transfer the TOUT value to the driving circuit 34, except when the engine is operating in a predetermined high-rate supercharged operating condition and at the same time, no abnormality is detected in the absolute pressure (PBTC) detecting means, in a manner hereinafter explained. The driving circuit 34 supplies a driving signal to the fuel injection valves 4 to drive them with a duty factor corresponding to the calculated TOUT value.

On the other hand, the value of the absolute pressure PBNA signal from the absolute pressure (PBNA) sensor 9', in FIG. 1, is supplied to a PBNA value register 28 and stored therein, after the same is converted into a digital signal by an analog-to-digital converter, not shown, which is in turn supplied to a high-rate supercharged operating condition detecting circuit 29. The high-rate supercharged operating condition detecting circuit 29 determines whether or not the value of the above absolute pressure (PBNA) signal is higher than a predetermined value (e.g. 1160 mmHg), and when the above PBNA value is higher than the above predetermined value, the same circuit 29 determines that the engine is operating in such high-rate supercharged operating condition. When the high-rate supercharged operating condition detecting circuit 29 determines that the engine is operating in the high-rate supercharged operating condition, the same circuit 29 generates a signal having a high level of 1 and applies it to the other input terminal of the NAND circuit 24. When signals having a high level of 1 are applied to the both input terminals of the NAND circuit 24, that is, when a signal having a high level of 1 is supplied to one input terminal of the NAND circuit 24 by the abnormality detecting circuit 21, consequent upon detecting that the value of the absolute pressure (PBTC) signal has remained outside the aforementioned predetermined range of values having upper and lower limits for a predetermined period of time and at the same time, a signal having a high level of 1 is supplied to the other input terminal from the high-rate supercharged operating condition detecting circuit 29, consequent upon determining that the engine is operating in the high-rate supercharged operating condition, the NAND circuit 24 generates a signal having a low level of 0 and applies it to the other input terminal of the AND circuit 33 to deenergize same. In other words, the transfer of the TOUT value from the TOUT value calculating control circuit 30 to the driving circuit 34 is interrupted to interrupt the fuel supply to the engine.

FIG. 3 shows a circuit for determining whether or not the engine is operating in a high-rate supercharged operating condition, in which the throttle valve opening th value is employed in place of the value of the absolute pressure (PBNA) signal from the absolute pressure (PBNA) sensor 9', shown in FIG. 2, to determine the high-rate supercharged operating condition. The throttle valve opening th value from the throttle valve opening sensor 13, shown in FIG. 1, is stored in a th value register 35 after being converted into a digital signal by an analog-to-digital converter, not shown. The above th value is supplied to a high-rate supercharged operating condition detecting circuit 29', wherein the above th value is compared with a predetermined value. When the above throttle valve opening th value exceeds the predetermined value, the high-rate supercharged operating condition detecting circuit 29 determines that the engine is operating in such high-rate supercharged operating condition and generates a signal having a high level of 1 and applies it to the NAND circuit 24. In the same way as explained with reference to FIG. 2, when the NAND circuit 24 then has its other input terminal supplied with another signal having a high level of 1 from the abnormality detecting circuit 21, thereby having both its input terminals supplied with signals having a high level of 1, the NAND circuit 24 generates a signal having a low level of 0 to deenergize the AND circuit 33 in FIG. 2.

Incidentally, the engine parameter signals for use to determine whether or not the engine is operating in the high-rate supercharged operating condition are not limited to the intake passage absolute pressure (PBNA) signal and the throttle valve opening th value signal but any other suitable engine parameter signals may be used for such purpose, instead.

What is claimed is:

1. A method for electronically controlling the quantity of fuel being supplied to an internal combustion engine having a turbocharger, an intake passage and a throttle valve arranged in said intake passage, and means for detecting pressure in said intake passage at a location downstream of said throttle valve, in response to values of engine control parameters including at least a value of intake passage absolute pressure of the engine detected by said pressure detecting means, the method comprising the steps of:

(1) detecting whether or not there is an abnormality in the functioning of said pressure detecting means;

(2) determining whether or not the engine is operating in a predetermined supercharged operating condition;

(3) determining the quantity of fuel by the use of a predetermined pressure value in lieu of the valve of said intake passage absolute pressure detected by said pressure detecting means when an abnormality is detected in the functioning of said pressure detecting means, only while the engine is determined to be operating in an operating condition other than said predetermined supercharged operating condition, and supplying the determined quantity of fuel to the engine; and (4) interrupting the fuel supply to the engine when an abnormality is detected in the functioning of said pressure detecting means, while the engine is determined to be operating in said predetermined supercharged operating condition.

2. A method as claimed in claim 1, wherein said step (2) comprises detecting pressure in said intake passage at a location downstream of said throttle valve by second pressure detecting means, and determining that the engine is operating in said predetermined supercharged operating condition when a value of the intake passage pressure detected by said second pressure detecting means exceeds a predetermined value.

3. A method as claimed in claim 2, further including the step of determining the quantity of fuel being supplied to the engine, by the use of a value of pressure in said intake passage detected by said first-mentioned pressure detecting means when the intake passage pressure is higher than said predetermined value, and by the use of a value of intake passage pressure detected by said second pressure detecting means when the intake passage pressure is lower than said predetermined value.

4. A method as claimed in claim 1, wherein said step (2) comprises detecting valve opening of said throttle valve, and determining that the engine is operating in said predetermined supercharged operating condition when a value of the valve opening of said throttle valve thus detected exceeds a predetermined value.

* * * * *